United States Patent
Moore et al.

(10) Patent No.: US 9,067,446 B1
(45) Date of Patent: Jun. 30, 2015

(54) SYSTEM FOR DETECTING INOPERATIVE INKJETS IN THREE-DIMENSIONAL OBJECT PRINTING USING A TEST PATTERN AND AN ULTRASONIC SENSOR

(71) Applicant: Xerox Corporation, Norwalk, CT (US)

(72) Inventors: Aaron M. Moore, Fairport, NY (US); Carlos M. Terrero, Ontario, NY (US); Roberto A. Irizarry, Rochester, NY (US); Timothy G. Shelhart, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/231,397

(22) Filed: Mar. 31, 2014

(51) Int. Cl.
*B41J 29/393* (2006.01)
*B41J 2/135* (2006.01)
*B41J 2/14* (2006.01)
*B33Y 30/00* (2015.01)

(52) U.S. Cl.
CPC .............. *B41J 29/393* (2013.01); *B33Y 30/00* (2014.12)

(58) Field of Classification Search
USPC ................................ 347/19, 44, 47
See application file for complete search history.

(56) References Cited

U.S. PATENT DOCUMENTS

| | | |
|---|---|---|
| 2004/0012112 A1 | 1/2004 | Davidson et al. |
| 2006/0111807 A1* | 5/2006 | Gothait et al. ............... 700/119 |
| 2006/0141145 A1 | 6/2006 | Davidson et al. |
| 2009/0011066 A1 | 1/2009 | Davidson et al. |
| 2010/0151136 A1 | 6/2010 | Davidson et al. |
| 2010/0184244 A1* | 7/2010 | Hunt .............................. 438/57 |
| 2013/0267413 A1* | 10/2013 | Oshiro .......................... 503/201 |

FOREIGN PATENT DOCUMENTS

WO 03/026876 A2 4/2003

* cited by examiner

*Primary Examiner* — Jason Uhlenhake
(74) *Attorney, Agent, or Firm* — Maginot Moore & Beck LLP

(57) ABSTRACT

A printer detects inoperative inkjets during printing of three dimensional objects. The printer includes a substrate onto which a printhead ejects building and support material in a test pattern. An ultrasonic sensor scans the substrate on the unprinted side and measures thicknesses at a plurality of locations on the substrate. The thickness measurements are used to identify inoperative inkjets in the printhead and the printing of an object can be suspended to take remedial action with regard to the printhead before formation of the object is completed.

16 Claims, 8 Drawing Sheets

SYSTEM FOR DETECTING INOPERATIVE INKJETS IN THREE-DIMENSIONAL OBJECT PRINTING USING A TEST PATTERN AND AN ULTRASONIC SENSOR

TECHNICAL FIELD

The device disclosed in this document relates to printers that produce three-dimensional objects and, more particularly, to accurate detection of inoperative inkjets in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three dimensional object with these printers can require hours or, with some objects, even days. One issue that arises in the production of three dimensional objects with a three dimensional printer is consistent functionality of the inkjets in the printheads that eject the drops of material that form the objects. During printing of an object, one or more inkjets can deteriorate by ejecting the material at an angle, rather than normal, to the inkjet, ejecting drops that are smaller than an inkjet should eject, or by failing to eject any drop at all. An inkjet suffering from any of these operational deficiencies is known as an inoperative inkjet. If the operational status of one or more inkjets deteriorates during object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. An apparatus that enables detection of inoperative inkjets while printing would enable restorative procedures to be applied during object printing so printing that can produce a properly formed object could continue. In this manner, product yield for the printer is improved and its printing is more efficient. The apparatus should be able to detect inoperative inkjets that eject a multitude of printing materials, such as clear, colored, translucent, phosphorescent, and waxy materials.

SUMMARY

An apparatus that enables inoperative inkjet detection in three dimensional printers includes a substrate having a surface, at least one ultrasonic sensor, the ultrasonic sensor being configured to generate an electrical signal corresponding to a thickness of the substrate and a material ejected onto the surface of the substrate by inkjets in a printhead at a position on the substrate opposite the at least one ultrasonic sensor, and a controller operatively connected to the at least one ultrasonic sensor, the controller being configured to receive the signal generated by the at least one ultrasonic sensor, and to detect inoperative inkjets in the printhead with reference to the signal received from the at least one ultrasonic sensor.

A printer that incorporates the apparatus for detecting inoperative inkjets includes a substrate having a surface, a printhead configured to eject material through inkjets in the printhead onto the surface of the substrate, at least one ultrasonic sensor, the ultrasonic sensor being configured to generate an electrical signal corresponding to a thickness of the substrate and material opposite the at least one ultrasonic sensor, and a controller operatively connected to the printhead, and the at least one ultrasonic sensor, the controller being configured to operate the printhead to eject ink onto the surface of the substrate with reference to a predetermined pattern, to receive the signal generated by the at least one ultrasonic sensor, and to detect inoperative inkjets in the printhead with reference to the signal received from the at least one ultrasonic sensor and the predetermined pattern.

BRIEF DESCRIPTION OF THE DRAWINGS

The foregoing aspects and other features of an apparatus or printer that detects inoperative inkjets during three dimensional printing are explained in the following description, taken in connection with the accompanying drawings.

DETAILED DESCRIPTION

Figure 1:
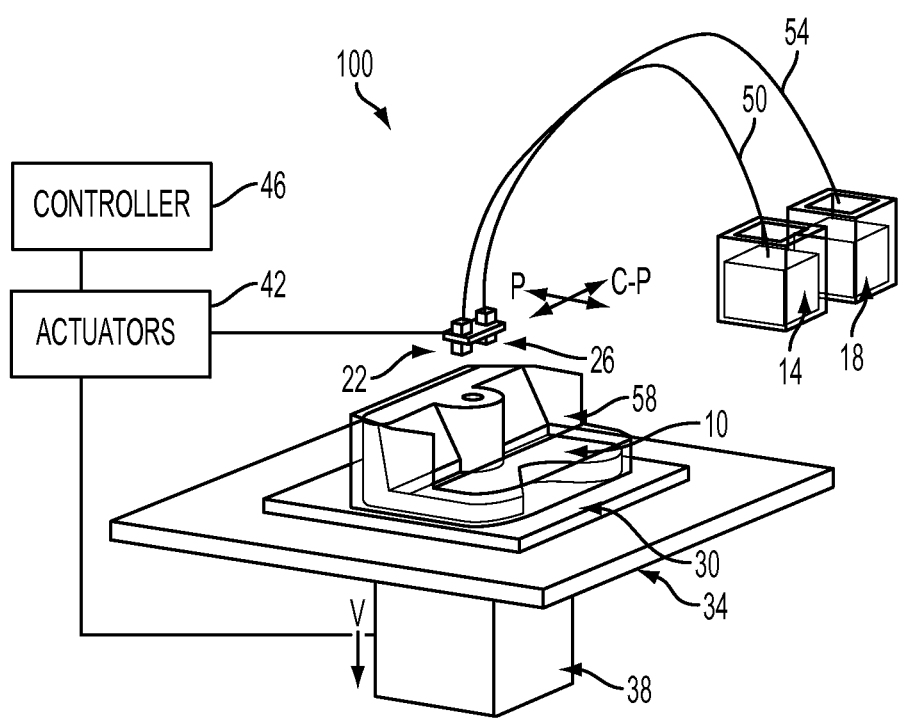
FIG. 1 is a perspective view of a three dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three dimensional printer" refers to any device that ejects material with reference to image data of an object to form a three dimensional object. The printer 100 includes a support material reservoir 14, a building material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to building material reservoir 18. Both inkjet printheads are operated by the controller 46 with reference to three-dimensional image data in a memory operatively connected to the controller to eject the support and building materials supplied to each respective printhead. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
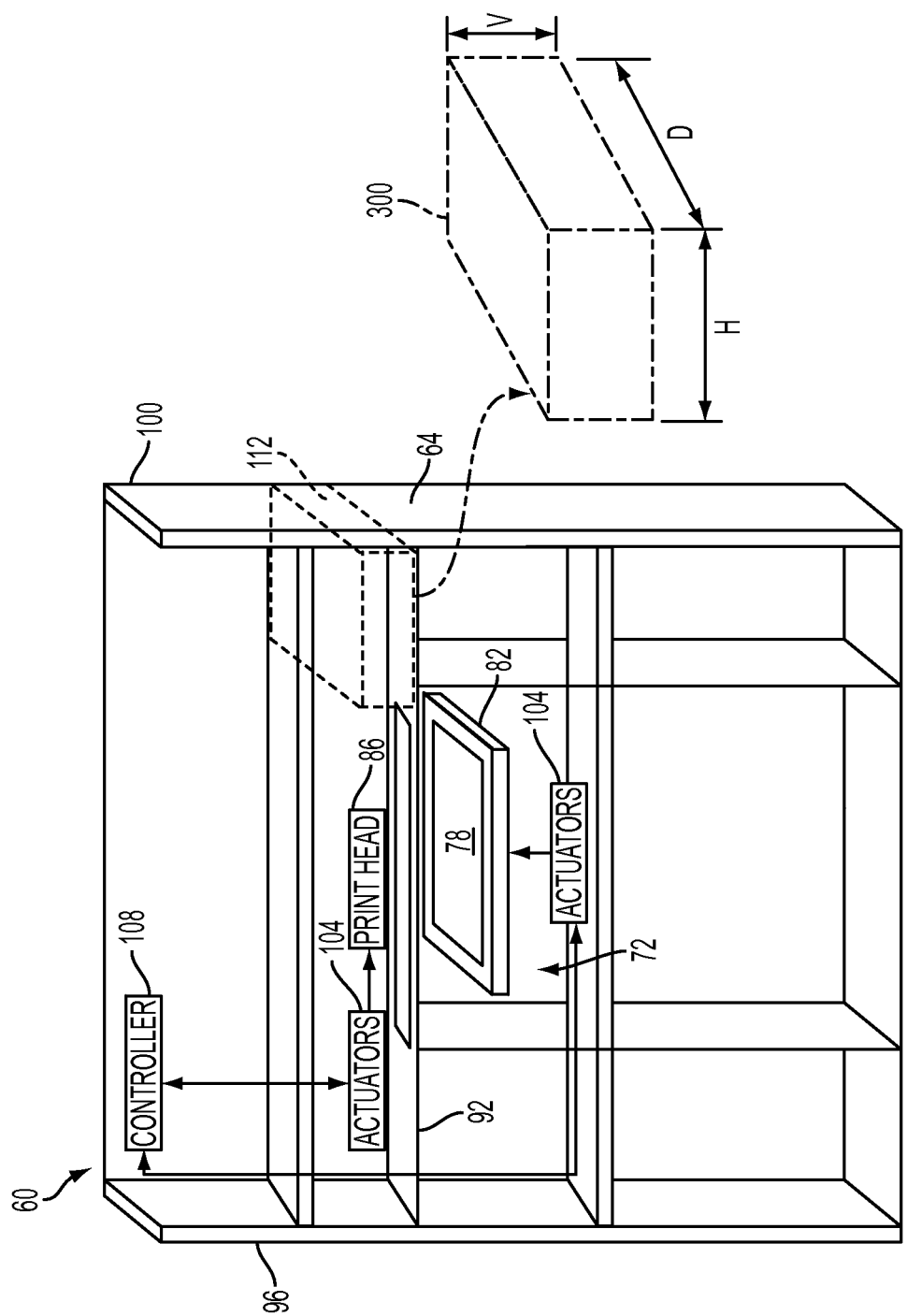
FIG. 2 is front view of a three dimensional object printer having a housing that depicts a space within the housing for a module that enables inoperative inkjets in the printhead to be detected during a printing operation.

A three dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86, vertically moving the support platform 82, and horizontally moving the printhead 86 on the member 92, a three dimensional object can be formed on the planar support 78.

The area 112 outlined in dashes in FIG. 2 identifies the placement of a module that uses electrical continuity checks to detect inoperative inkjets in the printer 60. As noted above, if an inkjet fails during printing of an object by either completely or partially failing to eject material or by errantly ejecting material in a skewed direction, the object being produced is malformed. Currently, this malformation cannot be detected until production of the object is finished. By using area 112 for an acoustic detection module, printer 60 can be configured to detect inoperative inkjets during object production as described more fully below. Some components within the module 300 can move in the horizontal direction H, depth direction D, and vertical direction V as shown in the figure.

Figure 3:
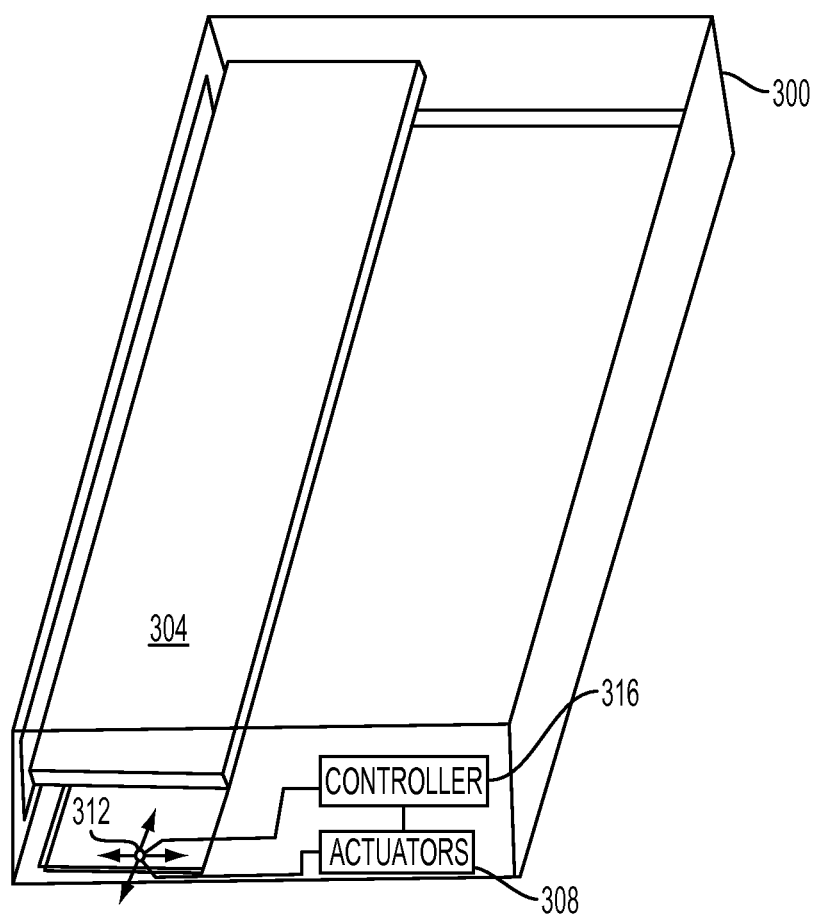
FIG. 3 is a perspective view of a module for detecting inoperative inkjets that fits in the space shown in FIG. 2.
Figure 5:
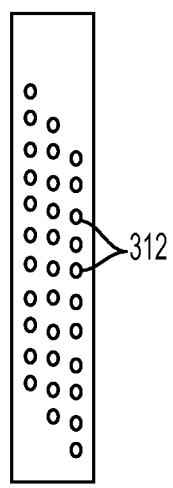
FIG. 5 is a depiction of an array of ultrasonic sensors arranged to correspond to inkjets in a printhead being tested.

One embodiment of a module that detects inoperative inkjets during object printing is shown in the block diagram of FIG. 3. The module 300 is configured to fit within area 112 of printer 60. The module 300 includes a substrate 304, one or more actuators 308, an ultrasonic sensor 312, and a controller 316. The controller 316 is operatively connected to the actuators 308 to move the ultrasonic sensor 312 over a lower surface of the substrate 304 in orthogonal directions within a plane adjacent to the substrate 304. In another embodiment, a plurality of ultrasonic sensors 312 is arranged in an array, such as that shown in FIG. 5, which corresponds to an arrangement of the inkjets in the printhead to be tested. In this embodiment, the substrate 304 is positioned over the array of ultrasonic sensors 312. The controller 316 is operatively connected either to the single ultrasonic sensor configured for movement in a plane (FIG. 3) or to plurality of ultrasonic sensors 312 arranged in a plane (FIG. 5). The ultrasonic sensors are operated by the controller 316 to activate a transducer in the sensors and generate an electrical signal corresponding to the thickness of the portion of the substrate contacting the sensor. These thicknesses are used to detect areas where building or support material has been ejected onto the surface of the substrate 304 and identify inoperative inkjets where building or support material is expected, but missing. The module 300 is configured to be installed in and removed from the printer 60 as a unit.

Figure 4:
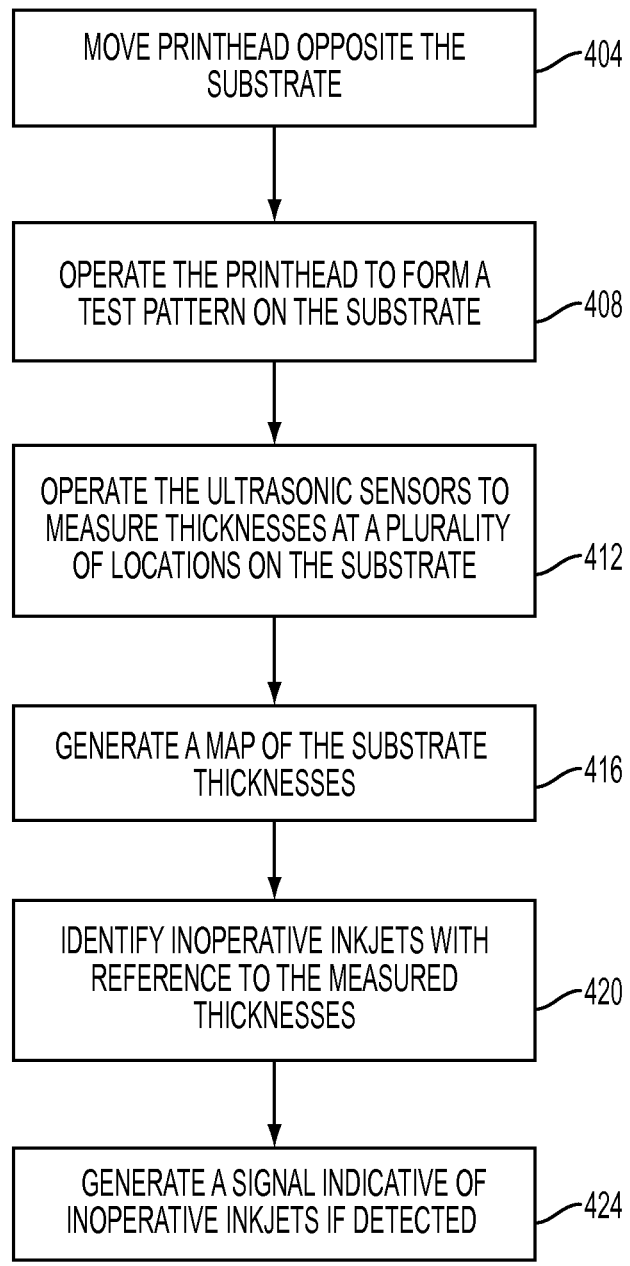
FIG. 4 is a flow diagram of a method for operating the module of FIG. 3.

To detect inoperative inkjets during printing operations, the module 300 is operated with reference to the method 400 shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 316 noted above can be such a controller or processor. Alternatively, the controller 316 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 to a position opposite the substrate 304 (block 404). In response to the controller 316 detecting that the printhead is in the module 300 at a position opposite the substrate 304, controller 316 generates a signal to the controller 108 to operate the inkjets in the printhead to print a test pattern (block 408). In one embodiment, each inkjet in the printhead is repetitively operated to form a pile of material on a portion of the substrate 304 opposite the inkjet. After the test pattern is printed, controller 108 generates a signal for controller 316 and, in response to the signal, controller 316 operates the one or more ultrasonic sensors 312 that contact the side of the substrate that was not printed with building material to measure the thickness of the substrate at a plurality of locations (block 412). In the embodiment having a single ultrasonic sensor 308, the controller 316 operates one or more actuators 308 to move the single sensor over the surface of the substrate 304 to measure the thickness of the substrate at the various locations. In the embodiment having an array of ultrasonic sensors, the controller 316 operates the ultrasonic sensors 312 to obtain a thickness measurement at each sensor. Controller 316 generates a map of the thickness measurements at the plurality of locations to detect the locations where building material was ejected on the other side of the substrate 304 (block 416). The controller 316 identifies inoperative inkjets as those inkjets that correspond to the locations wherein building material is expected, but the thickness measurement indicates no building or support material was ejected on the other side of the substrate (block 420). Controller 316 generates a signal indicative of a defective printhead for the operator of the printer when inoperative inkjets are detected (block 424). The operator can then take appropriate action.

Figure 6:
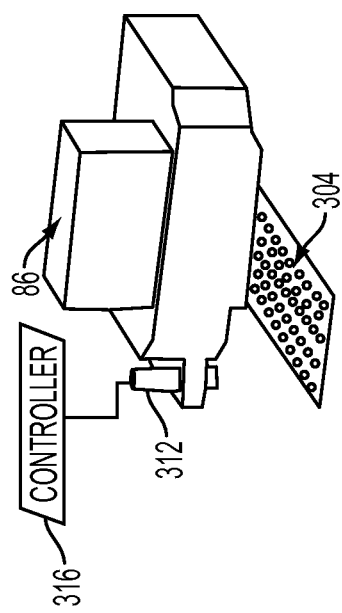
FIG. 6 shows an embodiment in which an ultrasonic sensor is fixedly attached to a printhead.
Figure 7:
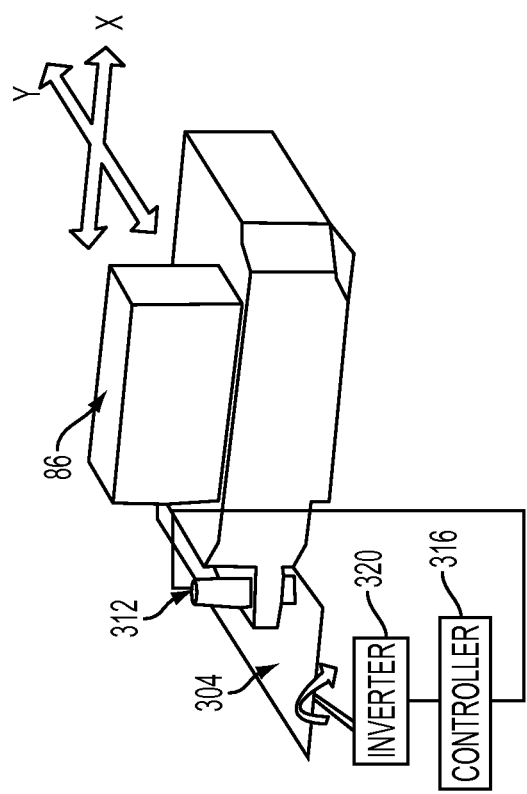
FIG. 7 shows an inverter in the embodiment of FIG. 6 rotating the test substrate to enable thickness measurements to be obtained by the ultrasonic sensor.

In another embodiment shown in FIG. 6, the ultrasonic sensor 312 is fixedly connected to the printhead 86 so the sensor moves with the printhead. To detect inoperative inkjets, the printhead/sensor combination moves into the module 300 to a position where the printhead is opposite the substrate. The controller 108 operates the printhead to form the test pattern on the substrate. Controller 108 generates a signal for controller 316 that indicates the test pattern printing is finished. Controller 316 then operates an inverter 320 to turn the substrate over and generates a signal for controller 108 to move the printhead to a position where the ultrasonic sensor is opposite the unprinted side of the substrate 304 (FIG. 7). Controller 108 then operates actuators 104 to move the ultrasonic sensor 312 over the surface of the substrate 304 in the X and Y directions as shown in the figure and controller 316 operates the ultrasonic sensor 312 to generate thickness measurements at a plurality of locations. These measurements are mapped and inoperative inkjets identified as discussed above.

Figure 8:
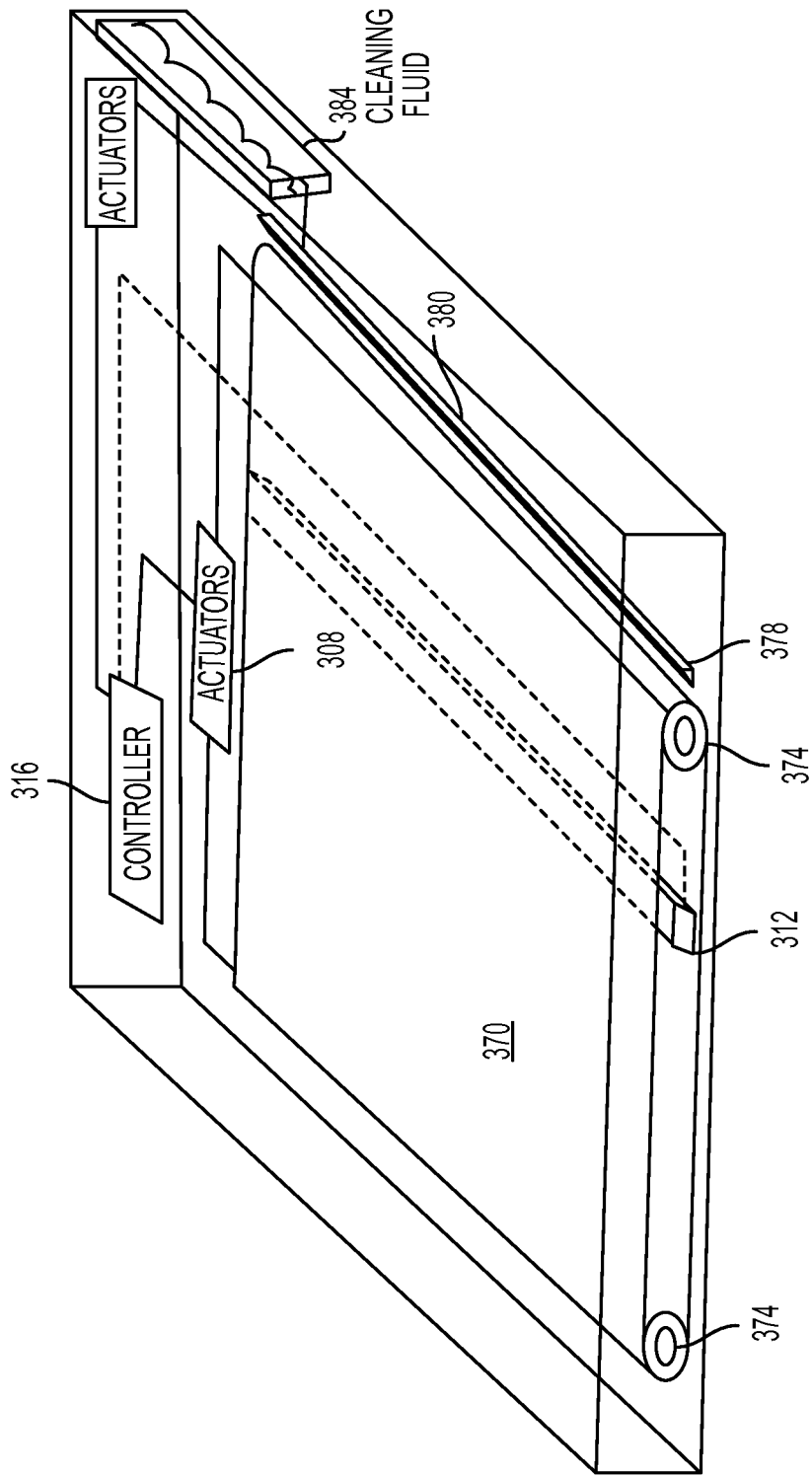
FIG. 8 depicts a test substrate configured as an endless belt with a wiper positioned to remove material from the substrate and the one or more ultrasonic sensors for measuring the substrate thickness at a plurality of locations.

In the embodiments discussed, the substrate 304 is printed with a test pattern. After the inkjets have been tested, the printhead 86 is moved above the planar support 78 and printing of the object continues provided no inoperative inkjets were detected. To prepare for the next inkjet test, the substrate needs to be either cleaned or replaced. In some embodiments, the module 300 is opened, the substrate is removed, and a new substrate is installed in the module. In other embodiments, the controller 316 operates an actuator 308 that is operatively connected to a wiper to remove the building material from the substrate and sweep it into a substrate depository, such as a tray. In some embodiments configured in this manner, the substrate can be an endless belt 370 entrained about two or more rollers 374 and the ultrasonic sensor 312 is positioned within the endless belt 370 (FIG. 8). A wiper 378 is positioned on the lower side of the endless belt 370 so controller 316 operates another actuator 308 to move the wiper 378 into and out of contact with the belt 370. After the ultrasonic sensor 312 has been moved underneath the area on which the test pattern was printed to obtain the thickness measurements, controller 316 can move wiper 378 into contact with the belt 370 and the roller 374 are rotated to enable the wiper 378 to remove test pattern material from the belt 370. The wiper 378 can also be configured with a conduit 380 that is fluidly connected to a source of cleaning fluid 384. During a cleaning operation, the cleaning fluid is pressurized to push the fluid through the conduit 380 and onto the belt 370 to help loosen the test pattern material from the substrate before the wiper 378 sweeps the belt. A waste receptacle can be positioned beneath the wiper 378 to collect the material and/or cleaning fluid. This receptacle can be configured for removal from the module so it can be emptied from time to time.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer for forming objects comprising:
a substrate having a surface;
a printhead configured to eject material through inkjets in the printhead onto the surface of the substrate;
at least one ultrasonic sensor, the ultrasonic sensor being configured to generate an electrical signal corresponding to a thickness of the substrate and material opposite the at least one ultrasonic sensor; and
a controller operatively connected to the printhead, and the at least one ultrasonic sensor, the controller being configured to operate the printhead to eject material onto the surface of the substrate with reference to a predetermined pattern, to receive the signal generated by the at least one ultrasonic sensor, and to detect inoperative inkjets in the printhead with reference to the signal received from the at least one ultrasonic sensor and the predetermined pattern.

2. The printer of claim 1 further comprising:
an actuator operatively connected to the printhead and the at least one ultrasonic sensor, the actuator being configured to move the printhead and the at least one ultrasonic sensor together;
an inverter configured to invert the substrate so the surface of the substrate onto which material is ejected faces the printhead in a first position and faces away from the printhead in a second position; and
the controller is further configured to operate the inverter to invert the substrate after the controller has operated the printhead to eject material onto the surface of the substrate, and to operate the actuator to move the at least one ultrasonic sensor over the inverted substrate to enable the controller to detect inoperative inkjets with reference to the signal generated by the at least one ultrasonic sensor.

3. The printer of claim 2, the actuator being configured to move the printhead and the at least one ultrasonic sensor in two orthogonal directions in a same plane.

4. The printer of claim 1, the at least one ultrasonic sensor further comprising:
a plurality of ultrasonic sensors positioned proximate a side of the substrate that does not receive material ejected from the printhead.

5. The printer of claim 4 wherein the plurality of ultrasonic sensors are arranged in an array that corresponds to an arrangement of the inkjets in the printhead.

6. The printer of claim 1 wherein the at least one ultrasonic sensor is positioned proximate a side of the substrate that does not receive material ejected from the printhead.

7. The printer of claim 1, the substrate further comprising:
an endless belt entrained about at least a pair of rollers;
an actuator operatively connect to at least one actuator to drive at last one of the rollers; and the controller is further configured to operate the actuator to move the endless belt.

8. The printer of claim 7 further comprising:
a wiper configured for movement from a first position where the wiper does not engage the endless belt and a second position where the wiper engages the endless belt;
another actuator operatively connect to the wiper to move the wiper between the first position and the second position; and
the controller is further configured to operate the other actuator to move the wiper between the first position and the second position and to operate the actuator to move the endless in response to the wiper being in the second position to enable cleaning of the endless belt with the wiper.

9. An apparatus for installation in a printer that forms three dimensional objects comprising:
a substrate having a surface;
at least one ultrasonic sensor, the ultrasonic sensor being configured to generate an electrical signal corresponding to a thickness of the substrate and a material ejected onto the surface of the substrate by inkjets in a printhead at a position on the substrate opposite the at least one ultrasonic sensor; and
a controller operatively connected to the at least one ultrasonic sensor, the controller being configured to receive the signal generated by the at least one ultrasonic sensor, and to detect inoperative inkjets in the printhead with reference to the signal received from the at least one ultrasonic sensor.

10. The apparatus of claim 9 further comprising:
an actuator operatively connected to the at least one ultrasonic sensor, the actuator being configured to move the at least one ultrasonic sensor; and
an inverter configured to invert the substrate so the surface of the substrate onto which material is ejected faces the printhead in a first position and faces away from the printhead in a second position; and
the controller is further configured to operate the inverter to invert the substrate after the printhead has ejected material onto the surface of the substrate, and to operate the actuator to move the at least one ultrasonic sensor over the inverted substrate to enable the controller to detect inoperative inkjets with reference to the signal generated by the at least one ultrasonic sensor.

11. The apparatus of claim 10, the actuator being configured to move the at least one ultrasonic sensor in two orthogonal directions in a same plane.

12. The apparatus of claim 9, the at least one ultrasonic sensor further comprising:
a plurality of ultrasonic sensors positioned proximate a side of the substrate that does not receive material ejected from the printhead.

13. The apparatus of claim 12 wherein the plurality of ultrasonic sensors are arranged in an array that corresponds to an arrangement of the inkjets in the printhead.

14. The apparatus of claim 9 wherein the at least one ultrasonic sensor is positioned proximate a side of the substrate that does not receive material ejected from the printhead.

15. The apparatus of claim 9, the substrate further comprising:
an endless belt entrained about at least a pair of rollers;
an actuator operatively connect to at least one actuator to drive at last one of the rollers; and
the controller is further configured to operate the actuator to move the endless belt.

16. The apparatus of claim 15 further comprising:
a wiper configured for movement from a first position where the wiper does not engage the endless belt and a second position where the wiper engages the endless belt;
another actuator operatively connect to the wiper to move the wiper between the first position and the second position; and
the controller is further configured to operate the other actuator to move the wiper between the first position and the second position and to operate the actuator to move the endless in response to the wiper being in the second position to enable cleaning of the endless belt with the wiper.

* * * * *